(12) United States Patent
Cha et al.

(10) Patent No.: US 8,934,448 B2
(45) Date of Patent: Jan. 13, 2015

(54) HANDOVER METHOD IN WIRELESS PORTABLE INTERNET SYSTEM

(75) Inventors: Jae-Sun Cha, Cheongju (KR); Sung-Cheol Chang, Daejeon (KR)

(73) Assignees: Electronics and Telecommunications Research Institute (KR); Samsung Electronics Co., Ltd (KR); KT Corporation (KR); SK Telecom Co., Ltd (KR); KTFreetel Co., Ltd (KR); Hanaro Telecom., Inc. (KR)

( * ) Notice: Subject to any disclaimer, the term of this patent is extended or adjusted under 35 U.S.C. 154(b) by 2660 days.

(21) Appl. No.: 10/588,248

(22) PCT Filed: Sep. 3, 2004

(86) PCT No.: PCT/KR2004/002244
§ 371 (c)(1),
(2), (4) Date: Apr. 30, 2007

(87) PCT Pub. No.: WO2005/074315
PCT Pub. Date: Aug. 11, 2005

(65) Prior Publication Data
US 2008/0049674 A1 Feb. 28, 2008

(30) Foreign Application Priority Data

Feb. 2, 2004 (KR) .................. 10-2004-0006626
Jun. 15, 2004 (KR) .................. 10-2004-0044014
Jul. 13, 2004 (KR) .................. 10-2004-0054556

(51) Int. Cl.
*H04W 4/00* (2009.01)
*H04W 36/00* (2009.01)

(52) U.S. Cl.
CPC .............. *H04W 36/0055* (2013.01)
USPC .......................... 370/331; 455/436

(58) Field of Classification Search
USPC ........................... 370/331; 455/436
See application file for complete search history.

(56) References Cited

U.S. PATENT DOCUMENTS
2003/0161284 A1 8/2003 Chen

FOREIGN PATENT DOCUMENTS

| DE | 198 14 440 A1 | 10/1999 |
| EP | 1 229 754 | 8/2002 |
| JP | 2000-059839 | 2/2000 |

OTHER PUBLICATIONS

Phillip Barber, "Revision of Hand-over Mechanism for Mobility Enhancement" Jan. 2, 2004, IEEE 802.16 Broadband Wireless Access Working Group, IEEE C802.16e-04/10.*

(Continued)

*Primary Examiner* — Marcos Batista
(74) *Attorney, Agent, or Firm* — The Farrell Law Firm, P.C.

(57) ABSTRACT

Disclosed is a handover method in a wireless portable Internet system. When a mobile subscriber station is in a drop state, a ranging request message including an identifier of a previous base station and a string generated by encoding the ranging request message using an authentication key of the previous base station is sent to a target base station. The target base station requests the previous base station to execute handover of the mobile subscriber station using the identifier of the previous base station included in the ranging request message. The previous base station carries out message authentication using the encoded string received from the target base station, and when the authentication is successful, transmits information about the mobile subscriber station that is required for handover to the target base station. Accordingly, a ceaseless service session can be provided even in the drop state.

16 Claims, 13 Drawing Sheets

(56) References Cited

OTHER PUBLICATIONS

Koo et al., "Inter-BS communication for IEEE 802.16e Handoff" May 14, 2003, IEEE 802.16 Broadband Wireless Access Working Group, IEEE 802.16e-03/29r1.*

Barber, "Revision of Hand-over mechanism for mobility Enhancement", Nov. 12, 2003, IEEE 802.16 Broadband Wireless Access Working Group, IEEE C802.16e-03/57r2.*

Sungcheol Chang et al., "HO Process in a Drop Situation", Sep. 4, 2003.

* cited by examiner

HANDOVER METHOD IN WIRELESS PORTABLE INTERNET SYSTEM

TECHNICAL FIELD

The present invention relates to a method of re-entering a subscriber station in a network through a target base station in a wireless portable Internet system. More specifically, the present invention relates to a handover method that does not interrupt a service session in a wireless portable Internet system.

BACKGROUND ART

Wireless mobile Internet is a next-generation communication method that adds motility to a short-distance data communication method using fixed access points, such as wireless LAN. Various standards for the wireless mobile Internet have been proposed, and international standardization of mobile Internet such as IEEE 802.16e has been carried out.

FIG. 1 illustrates the concept of wireless mobile Internet. A wireless portable Internet system includes a subscriber station 10, base stations 20 and 21 carrying out wireless communication with the subscriber station 10, routers 30 and 31 respectively connected to the base stations 20 and 21 through gateways, and the Internet.

A conventional wireless LAN method such as IEEE 802.11 provides a data communication method enabling wireless data communication in a LAN based on fixed access points. However, the convention wireless LAN method does not provide mobility of a mobile subscriber station and supports only wireless LAN data communication.

The wireless portable Internet system, which is being developed by the IEEE 802.16 group, secures mobility of the subscriber station 10 shown in FIG. 1 even when the subscriber station 10 moves from a cell managed by the base station 20 to a cell managed by the base station 21, to provide data communication service that does not interrupt a service session.

IEEE 802.16e is a standard supporting a metropolitan area network (MAN), which means an information communication network covering a middle-size area between an area managed by a LAN and an area covered by a WAN. Accordingly, the wireless portable Internet system supports handover of the subscriber station 10 as a mobile communication service does, and executes dynamic IP address allocation when the subscriber station is moved.

Here, the subscriber station 10 communicates with the base stations 20 and 21 using an orthogonal frequency division multiple access (OFDMA) method. The OFDMA method is a combination of a frequency multiplexing method using a plurality of orthogonal frequency subcarriers as a plurality of subchannels, and a time division multiplex (TDM) method. The OFDMA method is robust against fading generated in a multi-path, and has a high data transfer rate.

Furthermore, IEEE 802.16e employs an adaptive modulation and coding (AMC) method such that modulation and coding are adaptively selected between the subscriber station 10 and the base stations 20 and 21 according to request/acceptance.

FIG. 2 illustrates a hierarchical structure of the wireless portable Internet system. The hierarchical structure of the IEEE 802.16e wireless portable Internet system includes a physical layer L10 and a media access control (MAC) layer. The physical layer L10 is in charge of a wireless communication function, such as modulation, demodulation, and coding, carried out by a conventional physical layer.

In the wireless portable Internet system, a single MAC layer manages various functions, distinguished from a wired Internet system having layers subdivided by functions. The MAC layer includes a privacy sublayer L21, a MAC common part sublayer L22, and a service specific convergence sublayer L23. The service specific convergence sublayer L23 is in charge of payload header suppression and QoS mapping in continuous data communication. The MAC common part sublayer L22, which is an essential part of the MAC layer, processes system access, bandwidth allocation, connection setup, and maintenance, as well as QoS management. The privacy sublayer L21 carries out device authentication, security key exchange, and coding. The privacy sublayer L21 performs only the device authentication, and an upper layer (not shown) of the MAC layer carries out user authentication.

FIG. 3 illustrates a connection structure of a base station and a mobile subscriber station in the wireless portable Internet system. A connection C1 exists between the MAC layer of the subscriber station and the MAC layer of the base station. The term connection means a logical connection relationship, not a physical connection relationship, and it is defined as a mapping relationship between the MAC peers of the subscriber station and the base station for transmitting single service flow traffic. Accordingly, a parameter or a message defined on the connection C1 defines functions of the MAC peers. Actually, the parameter or message is processed into a frame and transmitted through a physical layer. Then, the frame is analyzed and a MAC layer carries out a function corresponding to the parameter or message.

A MAC message transmitted through the connection C1 includes a connection identifier (CID) that is a MAC layer address for identifying the connection; a MAP that defines symbol offsets and subchannel offsets of bursts, time-divided by the subscriber station on a downlink/uplink, and the number of symbols and subchannels of an allocated resource; and a downlink/uplink channel descriptor (DCD/UCD) that describes characteristics of a physical layer based on downlink/uplink characteristics. In addition, the MAC message includes various messages executing request (REQ), response (RSP), and acknowledgement (ACK) functions with respect to various operations.

FIG. 4 illustrates a frame structure of the wireless portable Internet system. Referring to FIG. 4, a frame is divided into a downlink frame F1 and an uplink frame F2 based on a transmission direction. The vertical axis of the frame means a subchannel, and its horizontal axis is a time axis.

The downlink frame F1 includes a preamble, a downlink MAP, an uplink MAP, and a plurality of downlink bursts. The downlink bursts are obtained by classifying a channel or a resource by transmission levels having the same modulation method or channel coding, not by users. Accordingly, the downlink MAP includes offset information, modulation method information, and coding information with respect to multiple users using the same modulation method and channel coding to perform resource application to the users. The MAP has a broadcast channel character and requires high robustness.

In the case of the uplink frame F2, data transmission is carried out for each user, and uplink bursts include user information.

FIG. 5 is a flow chart showing a connection setting process in the wireless portable Internet system.

When the subscriber station enters the area of the base station in the step S1, the base station sets downlink synchronization with the subscriber station in the step S2. When the downlink synchronization is set, the subscriber station acquires an uplink parameter in the step S3. For example, the parameter can include a channel descriptor message based on a characteristic of a physical layer (signal-to-noise ratio, for instance).

In the step S5, ranging between the subscriber station and the base station is carried out. Ranging is a process of matching timing, power, and frequency information of the subscriber station with those of the base station. Initial ranging is carried out first, and then periodic ranging is performed. When the ranging process is finished, negotiation about basic service providing capability for setting up the connection between the subscriber station and the base station is carried out in the step S5. When the negotiation is completed, the subscriber station is authenticated using a device identifier such as a MAC address of the subscriber station and a note of authentication in the step S6.

When the authentication of the subscriber station is accomplished so that the subscriber station is confirmed to be authorized to use the wireless portable Internet system, a device address of the subscriber station is registered in the step S7, and an IP address management system such as a DHCP server provides an IP address to the subscriber server to set up an IP connection in the step S8. In the step S9, the subscriber station provided with the IP address carries out connection setup for transmitting data.

In the meantime, the above-described wireless portable Internet system does not execute communication only at a fixed place, but it has mobility as high as a MAN level. Thus, the subscriber station uses a battery as a power supply means. Accordingly, battery use time becomes a large factor restricting utilization time in the wireless portable Internet system.

Therefore, the wireless portable Internet system such as IEEE 802.16e proposes a slip mode in order to save battery power. The slip mode allows the subscriber station to be in a sleep state for a sleep interval when there is no data transmitted to the subscriber station to save power of the subscriber station. When the subscriber station enters the sleep state, the subscriber station does not perform any operation for receiving data for the sleep interval.

When the sleep interval is finished, the subscriber station is converted into a listening mode to confirm whether there is data standing by ready to be transmitted to the subscriber station.

FIG. 6 is a flow chart showing a sleep mode operation in the wireless portable Internet system.

When the subscriber station wants to enter the sleep mode, the subscriber station should be approved by the base station. Accordingly, the subscriber station 10 that wants to enter the sleep mode sets a sleep interval and requests the base station 20 to approve the sleep mode (S10). When there is a sleep mode request, the base station designates a sleep interval and approves the sleep mode (S11). Then, the subscriber station enters the sleep mode state where the subscriber station does not receive any data from the moment M of time of entering the sleep mode (S12). When the initial sleep interval is finished, the subscriber station is converted into the listening mode to confirm whether there is data standing by ready to be transmitted from the base station to the subscriber station (S13). When there is no data standing by during the initial sleep interval, the base station sets a message representing presence of data traffic to 0 and transmits the message to the subscriber station (S14).

When the subscriber station confirms that there is no data transmitted thereto during the listening mode, the subscriber station enters the sleep mode again (S15). Here, a sleep interval can be identical to or longer than the initial sleep interval.

When there is data standing by ready to be transmitted to the subscriber station during the second sleep interval, the base station can buffer the data traffic (S17). The subscriber station is informed of the presence of the buffered data traffic when the subscriber station is in the listening mode (S18). When the subscriber station confirms that there is data traffic to be transmitted thereto in the listening mode (S16), the subscriber station finishes the sleep mode and enters an awake mode to receive the buffered data traffic and carry out data communication with the base station.

According to the aforementioned sleep mode operation, the subscriber station is in the sleep state continuously as long as there is no data to be transmitted to the subscriber station. Thus, unnecessary power consumption is prevented. In the wireless portable Internet system, however, data is lost in case of handover due to problems generated when the sleep mode or handover is executed.

FIG. 7 illustrates a handover process in the wireless portable Internet system. The wireless portable Internet system performs hard handover and backward handover because it carries out data transmission and reception. The backward handover means that a serving base station receives a handover request from a subscriber station to process handover. In this case, stable handover can be executed because the serving base station previously has information about the subscriber station.

A detailed handover method will now be explained. The subscriber station 10 transmits a handover request message HO/REQ that is a MAC message to the serving base station BS1 in order to carry out handover. The serving base station BS, which has received the handover request message HO/REQ, checks whether an adjacent base station can accept handover of the subscriber station 10, and then transmits a list of at least one target base station enabling handover to the subscriber station through a handover response message HO/RSP.

The subscriber station 10 receives the handover response message HO/RSP, selects a target base station BS2 from the destination base station list, informs the serving base station of the selected target base station BS2, and then attempt re-entry into a network via the target base station BS2.

FIG. 8 illustrates a drop state generated in a conventional wireless portable Internet system.

As described above, the subscriber station uses the sleep mode to reduce power consumption in the wireless portable Internet system. When handover is required while the subscriber station is in the sleep state, communication between the subscriber station and the serving base station is interrupted. Furthermore, communication between the subscriber station and the serving base station may be interrupted before handover of the subscriber station with the serving base station is finished.

After this drop phenomenon, when the subscriber station attempts re-entry into a network via the target base station BS2, the target base station BS2 cannot perform an initial networking process and must set up a required wireless channel because it does not have information about the subscriber station. Accordingly, a service session is not maintained. Moreover, the data buffered by the serving base station BS for the subscriber station is lost.

DISCLOSURE OF INVENTION

Technical Problem

It is an advantage of the present invention to provide a handover method in which a target base station can request handover in the case of a drop state while a serving base station can request handover.

It is another advantage of the present invention to provide a method of supporting a handover function even in a drop state through minimum correction in order to maintain consistency with existing handover methods while minimizing the length of a related wireless message to efficiently use radio resources.

Technical Solution

In one aspect of the present invention, a handover method in a wireless portable Internet system comprises: a) a mobile subscriber station determining whether a drop state is generated; b) the mobile subscriber station selecting a target base station from adjacent base stations when the mobile subscriber station determines that the drop state is generated; c) the mobile subscriber station including an identifier of a previous base station in an initial message and transmitting the initial message to the target base station; and d) the mobile subscriber station carrying out re-entry into a network through the target base station.

Here, the mobile subscriber station determining whether a drop state is generated can comprise receiving a base station identifier from an adjacent base station; comparing the received identifier with the identifier of a serving base station; and determining that the mobile subscriber station is in the drop state when the identifier of the adjacent base station is not identical to the identifier of the serving base station.

Furthermore, the mobile subscriber station determining whether a drop state is generated can comprise transmitting a handover request message to a serving base station; waiting for a handover response message for the handover request message; determining whether the handover response message arrives at the mobile subscriber station within a predetermined critical time; searching for the identifier of a base station currently communicating with the mobile subscriber station and comparing the searched identifier with the identifier of the previous base station when the handover response message does not arrive at the mobile subscriber station within the predetermined critical time; and determining that the mobile subscriber station is in the drop state when the searched identifier is not identical to the identifier of the previous base station.

In another aspect of the present invention, a handover method in a wireless portable Internet system comprises: a) a mobile subscriber station requesting a target base station to execute ranging; b) the mobile subscriber station including the identifier of a previous base station in a ranging request MAC message and transmitting the ranging request MAC message to the target base station; c) the target base station requesting the previous base station to execute handover of the mobile subscriber station based on an identifier of the previous base station; d) the previous base station transmitting information about the mobile subscriber station to the target base station for handover; and e) the mobile subscriber station re-entering a network through the target base station.

In another aspect of the present invention, a handover method in a wireless portable Internet system comprises: a) a mobile subscriber station requesting a target base station to execute ranging; b) the mobile subscriber station including the identifier of a previous base station and a string generated by encoding a ranging request MAC message in the ranging request MAC message and transmitting the ranging request MAC message to the target base station; c) the target base station requesting the previous base station to execute handover of the mobile subscriber station based on an identifier of the previous base station; d) the previous base station authenticating the MAC message using the encoded string: e) the previous base station transmitting information about the mobile subscriber station to the target base station for handover when the authentication is successful; and f) the mobile subscriber station re-entering a network through the target base station.

Here, the d) encodes the received MAC message using an authentication key, compares the encoded result with the encoded string, and authenticates the MAC message when the encoded result is identical to the encoded string.

BRIEF DESCRIPTION OF THE DRAWINGS

The accompanying drawings, which are incorporated in and constitute a part of the specification, illustrate an embodiment of the invention, and, together with the description, serve to explain the principles of the invention.

BEST MODE FOR CARRYING OUT THE INVENTION

Figure 1:
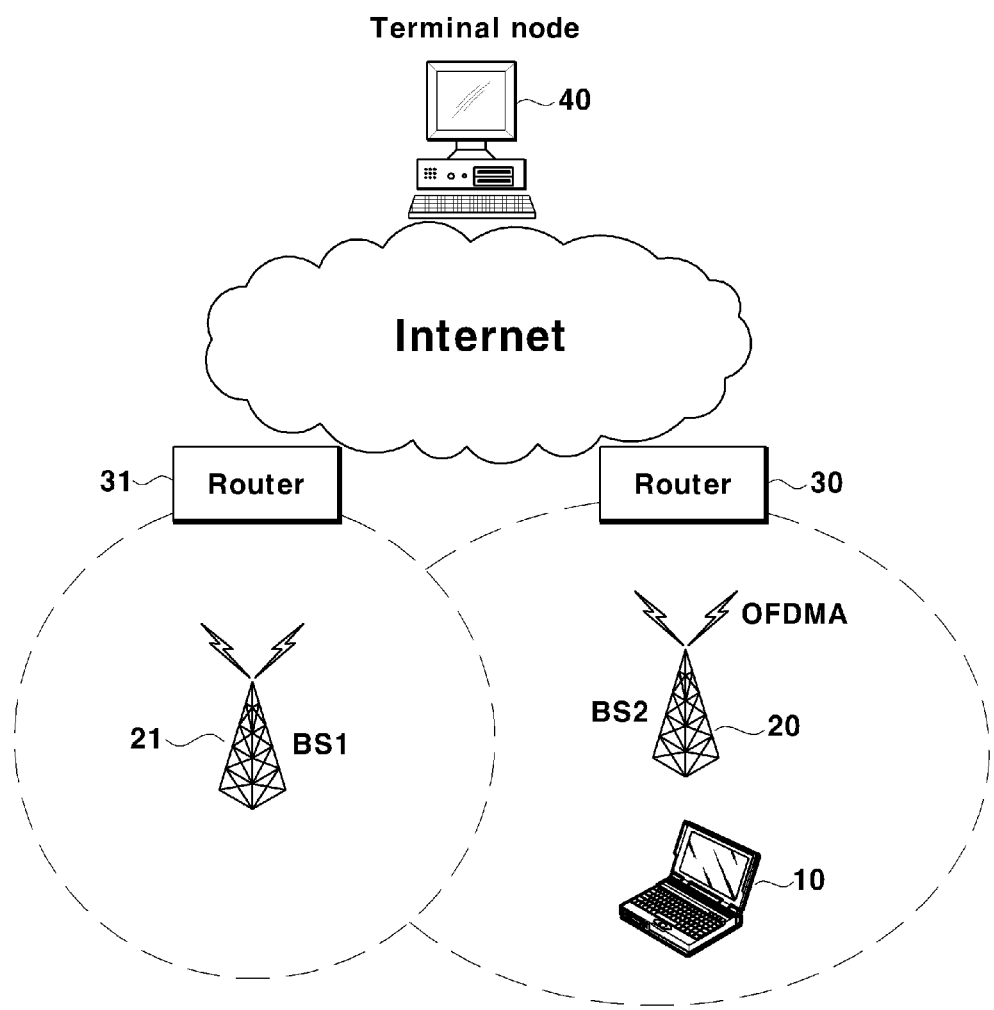
FIG. 1 illustrates the wireless mobile Internet.
Figure 2:
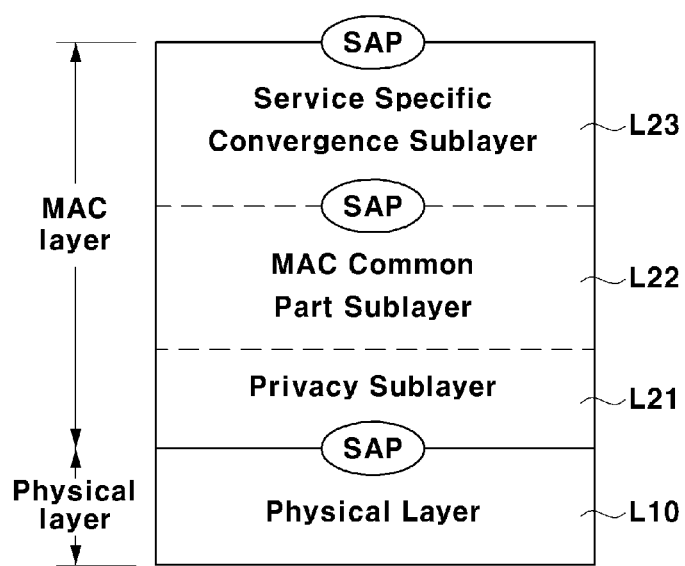
FIG. 2 illustrates a hierarchical structure of a conventional wireless portable Internet system.
Figure 3:
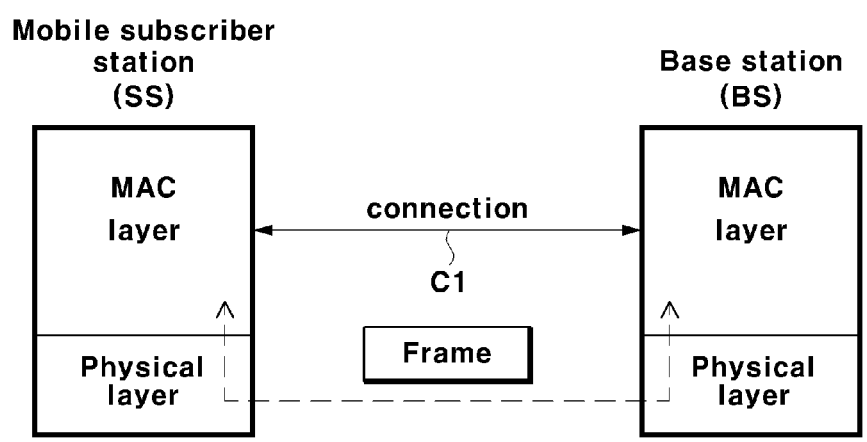
FIG. 3 illustrates a connection structure of a base station and a subscriber station in the conventional wireless portable Internet system.
Figure 4:
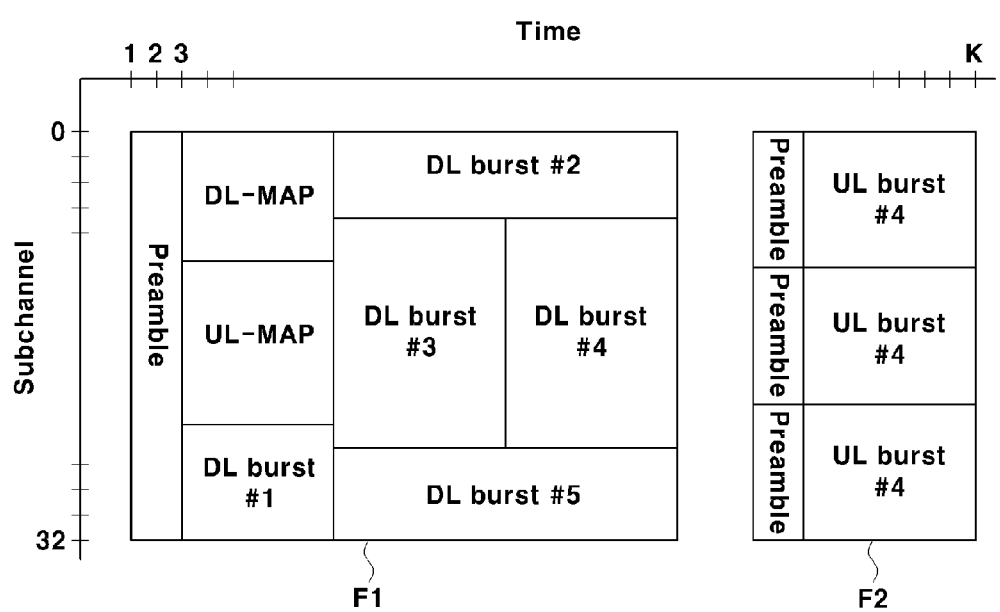
FIG. 4 illustrates a frame structure of the conventional wireless portable Internet system.
Figure 5:
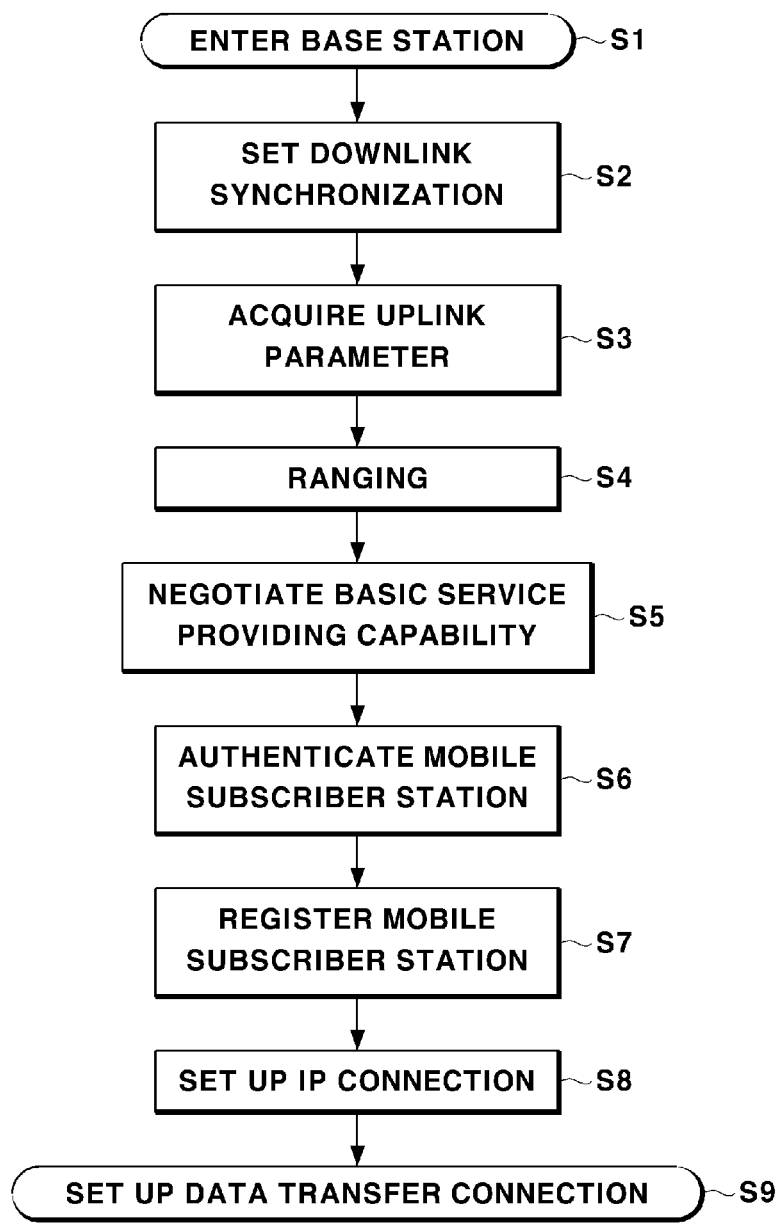
FIG. 5 is a flow chart showing a connection setting process in the conventional wireless portable Internet system.
Figure 6:
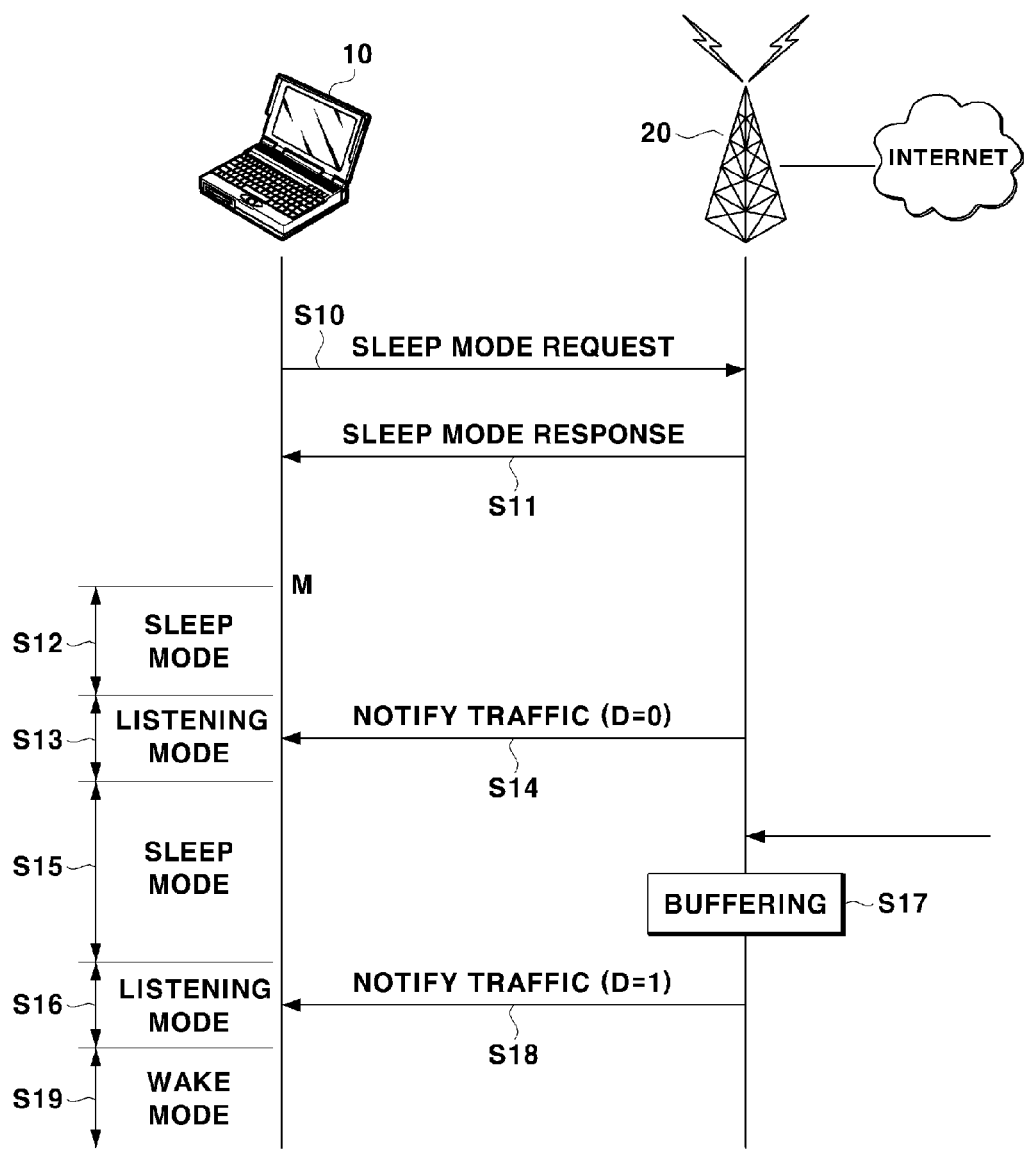
FIG. 6 is a flow chart showing a sleep mode operation in the conventional wireless portable Internet system
Figure 7:
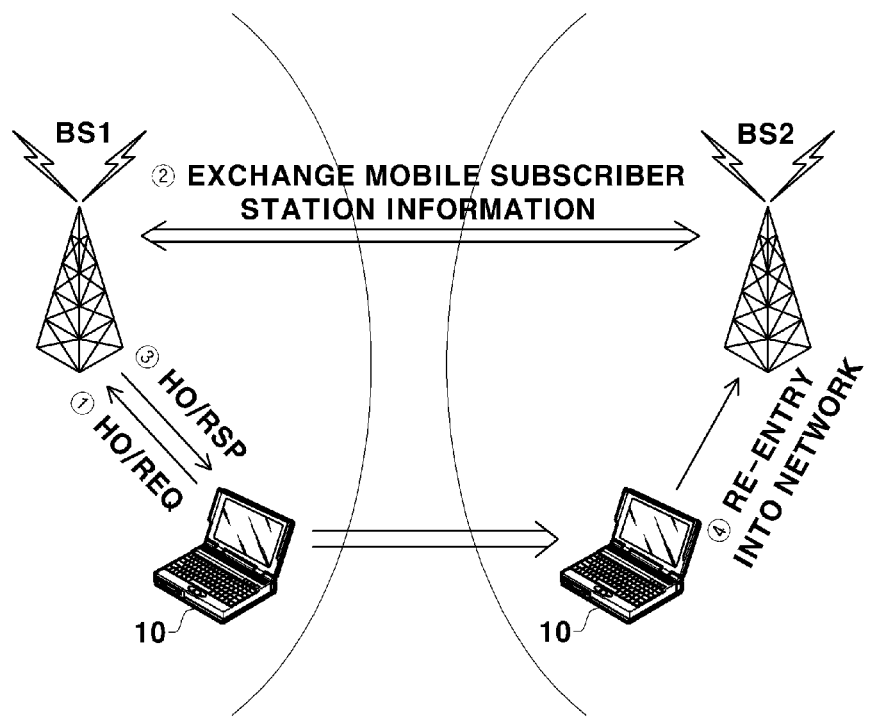
FIG. 7 illustrates a handover process in the conventional wireless portable Internet system
Figure 8:
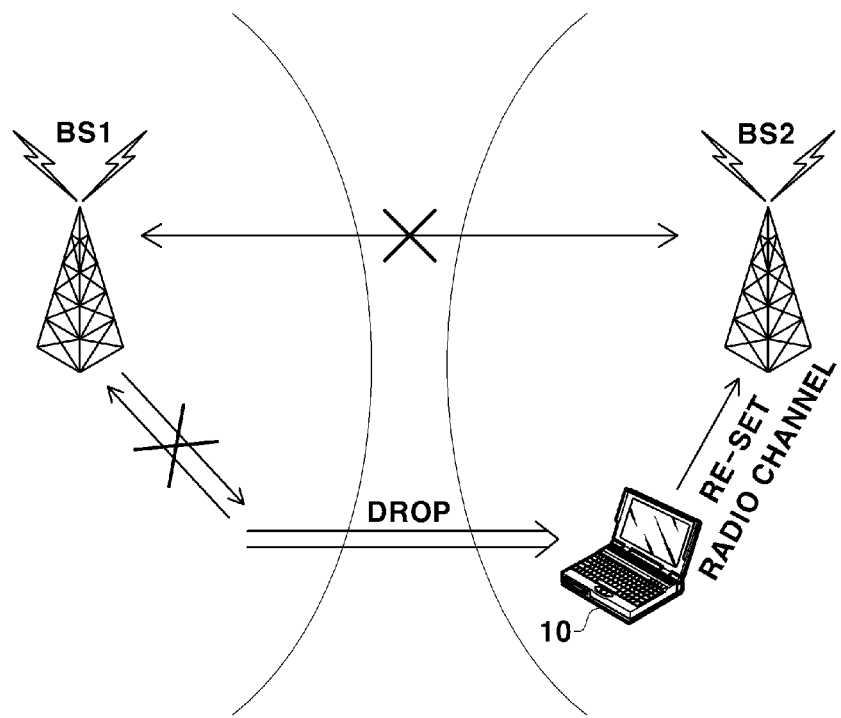
FIG. 8 illustrates a drop state in the conventional wireless portable Internet system.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

A handover method according to an embodiment of the present invention will now be explained with reference to the attached drawings.

Figure 9:
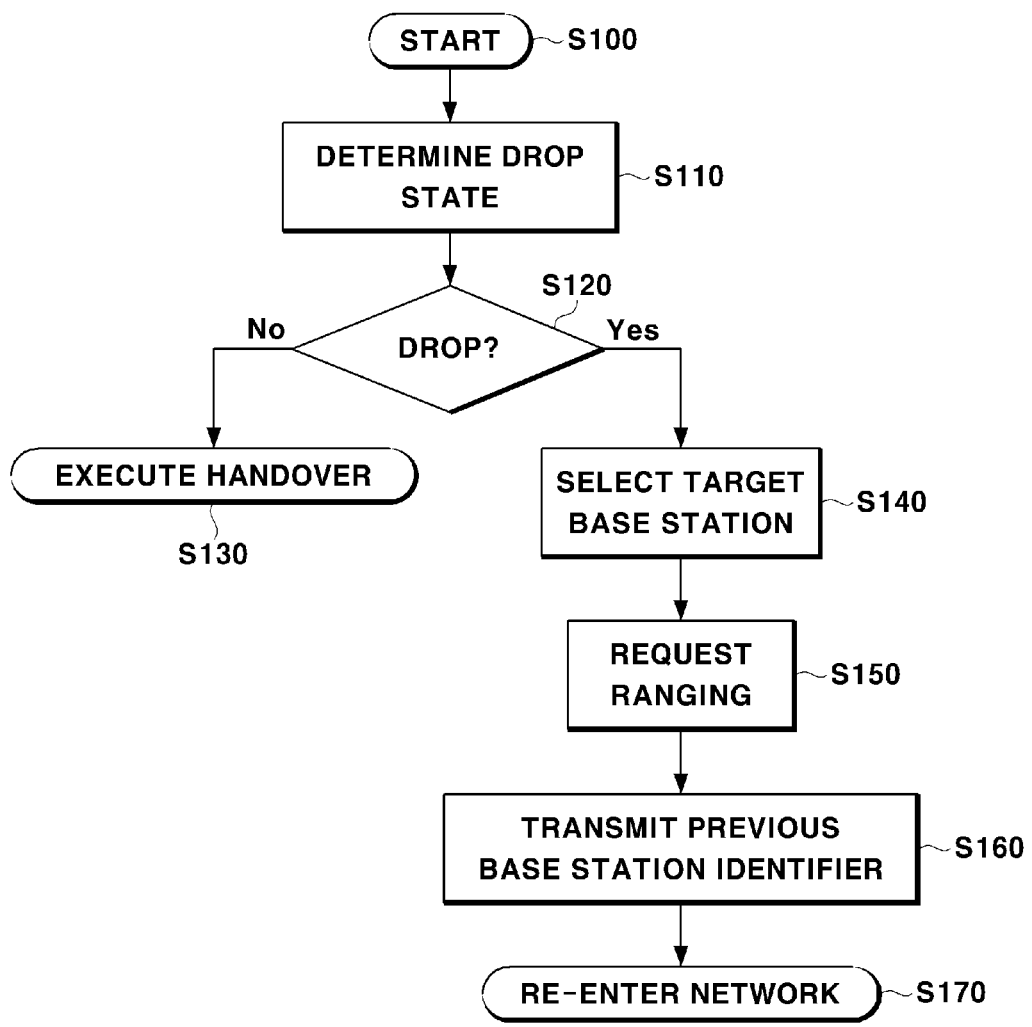
FIG. 9 is a flow chart showing a method of executing handover of a subscriber station according to an embodiment of the present invention.

FIG. 9 is a flow chart showing a method of executing handover of a mobile subscriber station according to an embodiment of the present invention. Referring to FIG. 9, when handover is required, the mobile subscriber station determines whether the aforementioned drop state is generated in the step S110. The drop state is generated caused by movement of the mobile subscriber station in the sleep mode and movement of the mobile subscriber station when handover between serving base stations is not yet finished. A method of determining the drop state will be described later.

When the mobile subscriber station determines that the drop state is not generated in the step S120, a serving base station processes handover in the step S130. When the mobile subscriber station determines that the drop state is generated in the step S120, the mobile subscriber station selects a target base station in the step S140. The target base station is selected from adjacent base stations. The mobile subscriber station can select the target base station based on a base station output power level.

When the target base station is selected, the mobile subscriber station requests the target base station to carry out ranging in the step S150. As described above, ranging is a process of adjusting initial timing, power, and frequency between the mobile subscriber station and base station. The mobile subscriber station includes the identifier of the previous base station in a ranging request message RNG/REQ, which is a MAC message requesting initial ranging, and transmits the ranging request message RNG/REQ including the identifier in the step S160. The target base station receives the previous base station identifier and requests the previous base station to send information about the mobile subscriber station. Accordingly, the target base station receives information for forming a wireless channel with the mobile subscriber station.

The mobile subscriber station attempts re-entry into a backbone network through the target mobile subscriber station in the step S170. The target base station provides information the previous base station has to the mobile subscriber station such that the mobile subscriber station that re-enters the network can be provided with ceaseless service.

Figure 10:
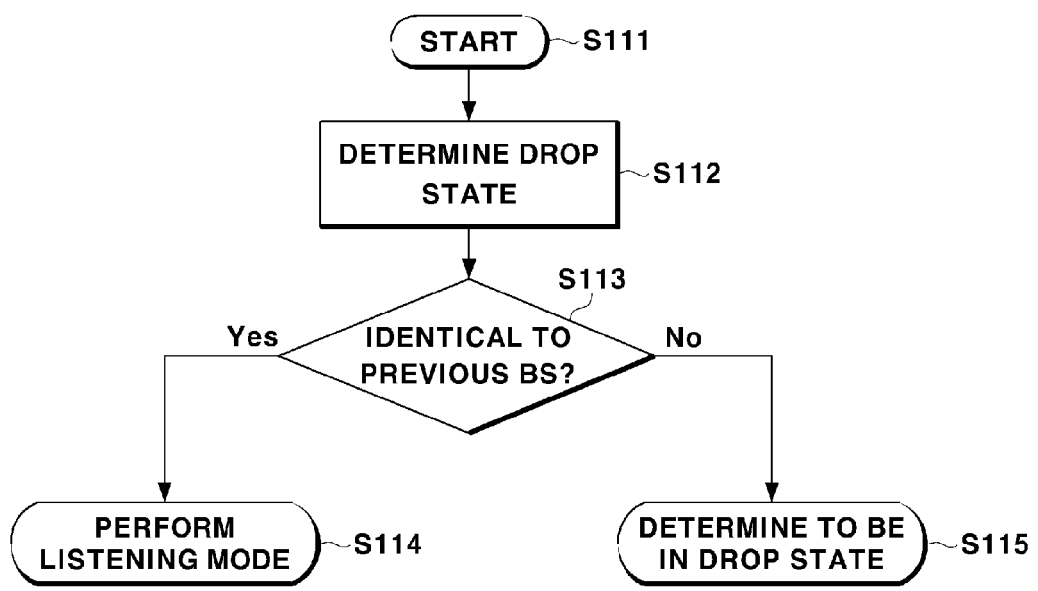
FIG. 10 is a flow chart showing a method of determining a drop state according to an embodiment of the present invention.

FIG. 10 is a flow chart showing a method of determining a drop state by the mobile subscriber station according to an embodiment of the present invention.

When the sleep mode is finished, the mobile subscriber station receives a base station identifier from the base station in the step S112. If the mobile subscriber station leaves the area of the previous serving base station, an output power level of the previous serving base station is decreased below a threshold and the mobile subscriber station receives the identifier of a new target base station.

The mobile subscriber station compares the received base station identifier with the identifier of the previous base station in the step S113. When the two identifiers are identical to each other, which means that handover has not been generated, the listening mode operation is carried out in the step S114. If the base station identifiers are not identical to each other, which means handover is required while the mobile subscriber station is in the sleep mode, the mobile subscriber station determines that the drop state is generated and performs handover according to the process shown in FIG. 9 in the step S115.

Figure 11:
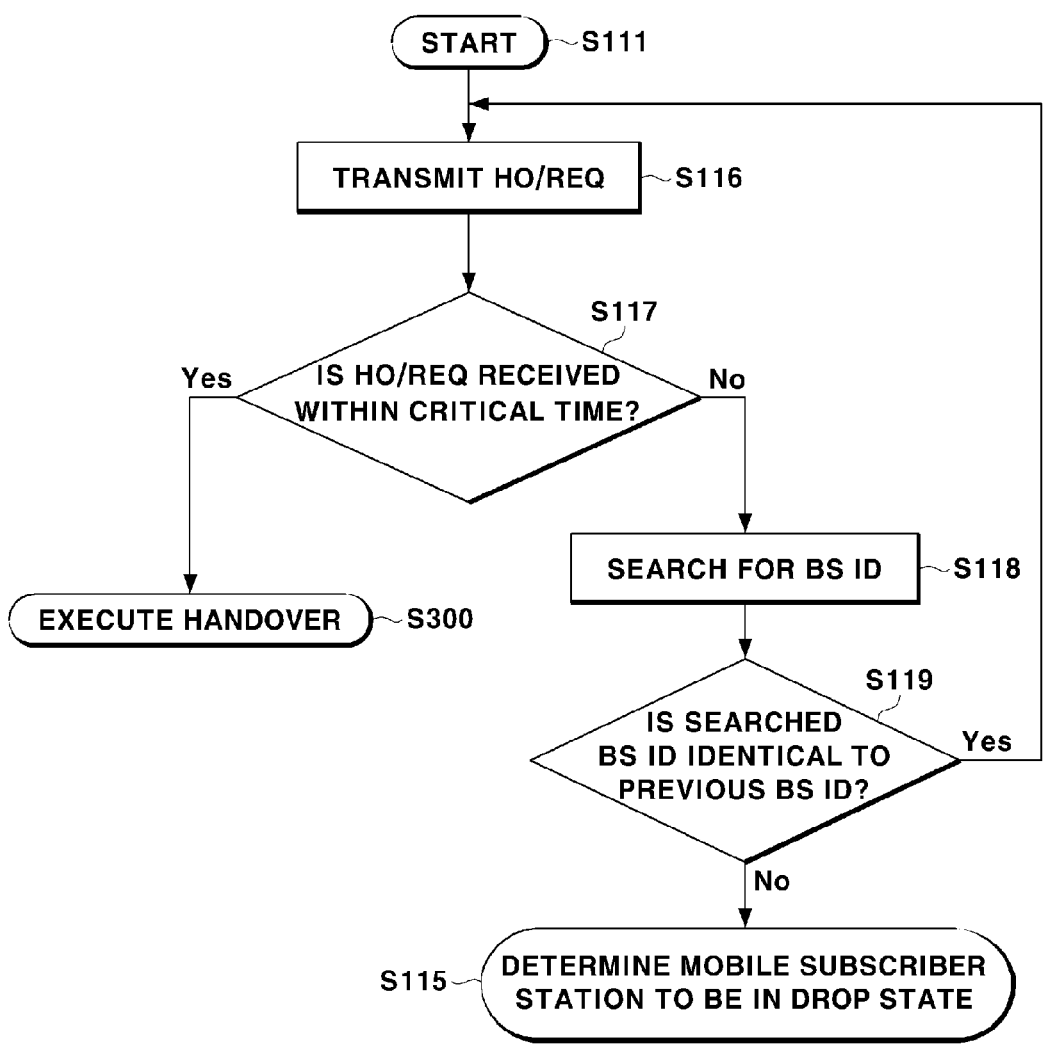
FIG. 11 is a flow chart showing a method of determining a drop state according to another embodiment of the present invention.

FIG. 11 is a flow chart showing a method of determining a drop state according to another embodiment of the present invention.

As described above, when the mobile subscriber station is moved to the area of another base station before handover is finished, handover may fail.

When handover is required, the mobile subscriber station transmits an initial handover request message HO/REQ to the serving base station in the step S116. When the serving base station receives the handover request message HO/REQ, the serving base station transmits information about the mobile subscriber station to adjacent base stations and sends a list of the adjacent base stations to the mobile subscriber station through a handover response message HO/RSP. The mobile subscriber station checks whether the handover response message HO/RSP has been received within a critical time in the step S117. If the handover response message HO/RSP has arrived at the mobile subscriber station within the critical time, the conventional handover process is carried out in the step S300. However, when the handover response message HO/RSP has not reached the mobile subscriber station within the critical time, the mobile subscriber station determines whether a drop state is generated. Accordingly, the mobile subscriber station searches for the identifier of the base station managing the current coverage area in the step S118. Then, the mobile subscriber station checks whether the searched identifier is identical to the identifier of the previous base station in the step S119. If the searched identifier is identical to the previous base station identifier, it is determined that handover is not properly carried out because of a problem other than the drop phenomenon. When the two identifiers are not identical to each other, it is determined that the subscriber station is in the drop state.

Accordingly, when the searched identifier is identical to the identifier of the previous base station in the step S119, the mobile subscriber station transmits the handover request message to the serving base station again to retry the handover process. However, when the searched identifier is not identical to the identifier of the previous base station, the mobile subscriber station determines that the drop state is generated in the step S115 and performs the handover process shown in FIG. 9.

As described above, the mobile subscriber station can determine both the drop state generated in the sleep mode and the drop state generated while handover is processed. When the drop state is generated, the target base station carries out the handover process.

Figure 12:
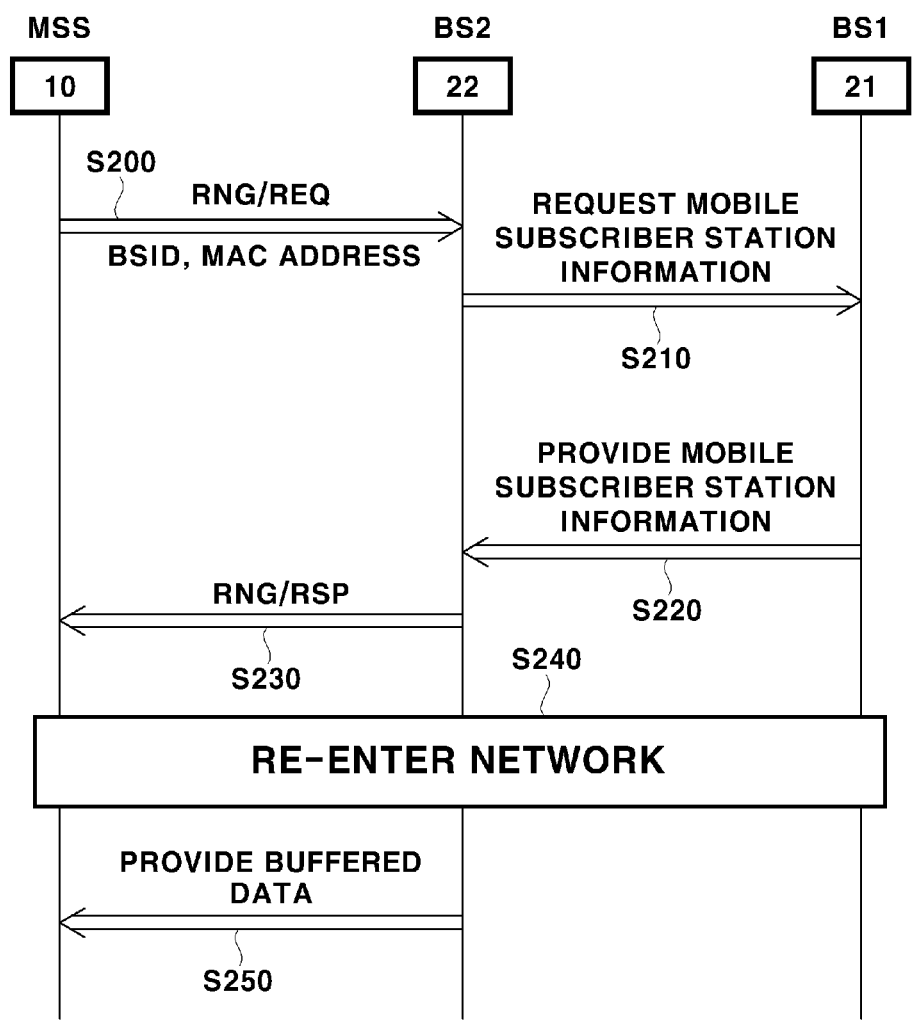
FIG. 12 is a signal flow chart showing a handover method according to an embodiment of the present invention.

FIG. 12 is a signal flow chart showing a handover method according to an embodiment of the present invention.

Referring to FIG. 12, a mobile subscriber station 10 that attempts to re-enter a network through a target base station 22 executes a ranging process with the target base station 22. In the embodiment of the present invention, the mobile subscriber station 10 includes a previous base station identifier BS ID in a ranging request message RNG/REQ and transmits the ranging request message TNG/REQ to the base station 22 (S200). The ranging request message RNG/REQ is one of MAC messages and it can include a MAC address of the mobile subscriber station in addition to the previous base station identifier. Preferably, the previous base station identifier BS ID has a length of 48 bits such that it can be included in the ranging request message RNG/REQ.

The target base station 22 that has received the previous base station identifier BS ID included in the ranging request message RNG/REQ requests the previous base station 21 corresponding to the identifier to send information about the mobile subscriber station and to execute handover (S210). Then, the previous base station 21 provides information about the mobile subscriber station, which is required for handover for ceaseless service, to the target base station 22 (S220).

The target base station 22 transmits a ranging response message to the mobile subscriber station 10 in order to carry out the ranging process with the mobile subscriber station (S230). When the ranging process is completed between the mobile subscriber station 10 and the target base station 22, the mobile subscriber station 10 re-enters the network through registration and authentication (S240). Subsequently, the target base station 22 provides data buffered by the previous base station 21 to the mobile subscriber station (S250).

In the case where the mobile subscriber station is in the drop state, the target base station 22 executes handover and receives the mobile subscriber station information from the previous base station 21. If there is data buffered during the sleep mode operation, the target base station 22 provides the data to the mobile subscriber station right after handover.

In a conventional wireless portable Internet system such as IEEE 802.16, the previous base station identifier is provided before the initial ranging message is transmitted such that handover delay time is minimized even in the drop state.

Figure 13:
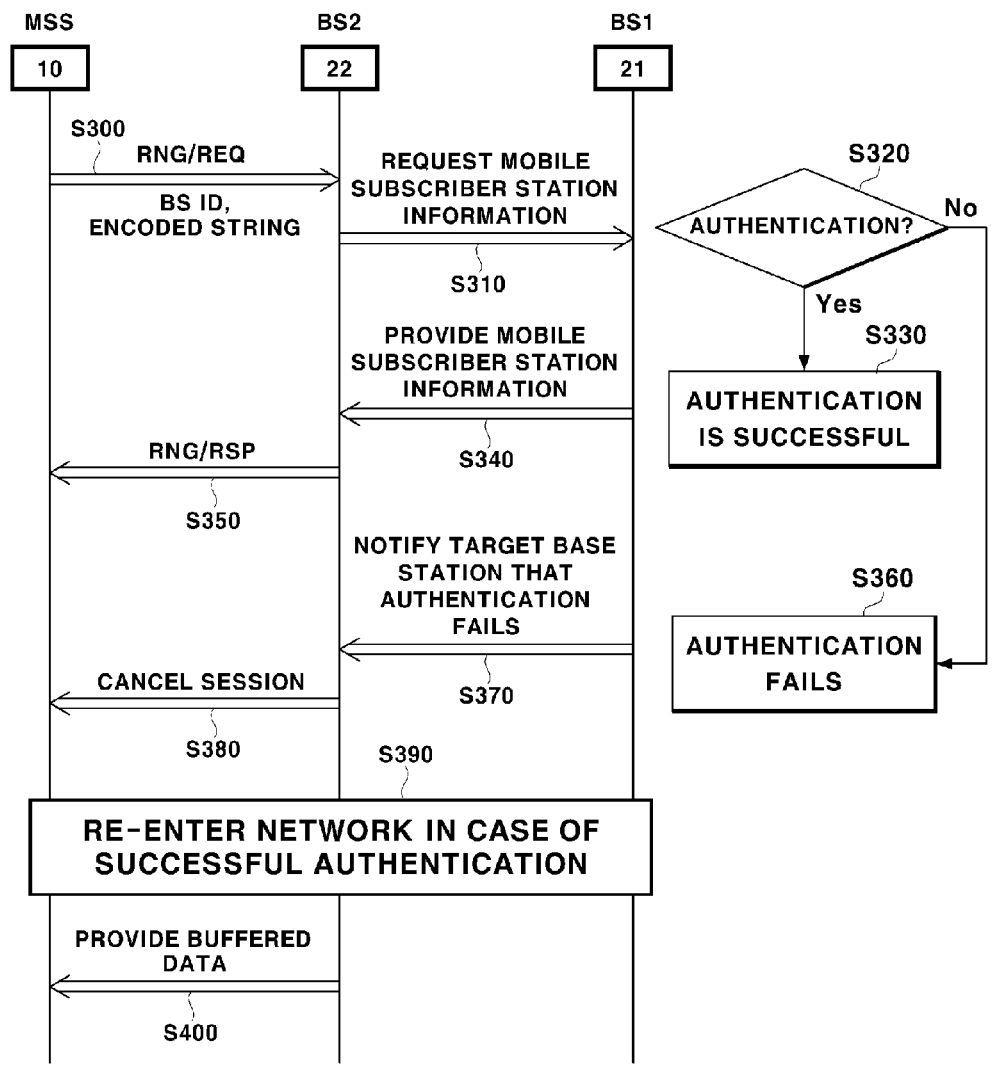
FIG. 13 is a signal flow chart showing a handover method according to another embodiment of the present invention.

FIG. 13 is a signal flow chart showing a handover method according to another embodiment of the present invention.

Referring to FIG. 13, the mobile subscriber station 10 that attempt to re-enter the network through the target base station 22 executes the ranging process with the target base station 22. In this embodiment, the mobile subscriber station 10 transmits the ranging request message RNG/REQ including the previous base station identifier BS ID and a string obtained by encoding the message to the target base station 22 (S300). The string is generated by encoding a part of the message using an authentication key provided by the previous base station 21.

The target base station 22 that has received the previous base station identifier BS ID included in the ranging request message RNG/REQ requests the previous base station 21 corresponding to the received identifier to send the mobile subscriber station information to execute handover (S310). Here, the target base station 22 transmits the ranging request message together with the encoded string to the previous base station 21. Then, the previous base station 21 encodes the message using the authentication key thereof and compares the encoded result with the transmitted encoded string to carry out authentication (S320). If the encoded result is identical to the encoded string, the previous base station 21 determines that a valid mobile subscriber station requests handover. When the encoded result is not identical to the encoded string, the previous base station 21 determines the request from the target base station 22 to be inappropriate.

When the authentication is successful in the step S310, the previous base station 21 provides the information about the mobile subscriber station 10, required for executing handover, to the target base station 22 (S340). Here, the previous base station 21 can transmit the authentication key information in addition to the mobile subscriber station information to the target base station 22.

The target base station 22 transmits the ranging response message to the mobile subscriber station (S350). If the authentication fails (S360), the previous base station 21 notifies the target base station 22 that the authentication fails (S370), and a session between the mobile subscriber station 10 and the target base station 22 is cancelled (S380). When the session is cancelled, the mobile subscriber station 10 should set up wireless connection with the target base station 22 through an initial wireless connection.

When the authentication of the previous base station and the ranging process are finished in the step S350, the mobile subscriber station 10 re-enters the network through registration and authentication (S390). Subsequently, the target base station 22 provides data buffered by the previous base station 21 to the mobile subscriber station (S400).

According to the aforementioned embodiment of the present invention, it is possible to prevent a user from unintentionally executing handover in case of network re-entry.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

According to the present invention, the target base station executes handover through re-entry into a network even when the mobile subscriber station is in the drop state. Accordingly, a service session is maintained to provide ceaseless mobile service. Furthermore, the present invention provides information about the previous serving base station using an initial message RNG/REQ transmitted to the target base station such that information about the mobile subscriber station is exchanged between the previous base station and the target base station through a backbone network while a process that does not need the mobile subscriber station information is carried out. Accordingly, handover delay time generated in the drop situation can be minimized.

Moreover, the present invention performs the handover process proposed by IEEE 802.16 with only a simple correction of the process such that handover to the target base station can be executed in the drop state. Thus, additional cost required when the handover method of the present invention is applied to the conventional process can be reduced. Furthermore, the present invention can prevent unintentional handover that attempts to use the mobile subscriber station information stored in the previous base station.

The invention claimed is:

1. A method of performing a handover on a subscriber station in a target base station, the method comprising:
   receiving a ranging request message including a base station identifier of a previous serving base station from the subscriber station when a drop situation is detected by the subscriber station;
   acquiring information of the subscriber station through the base station identifier of the previous serving base station;
   transmitting a response message on the ranging request message to the subscriber station; and
   performing network re-entry on the subscriber station.

2. The method of claim 1, wherein the acquiring comprises:
   requesting the information of the subscriber station to the previous serving base station based on the base station identifier of the previous serving base station; and
   receiving the information of the subscriber station from the previous serving base station.

3. The method of claim 1, wherein the ranging request message further includes a media access control (MAC) address of the subscriber station.

4. The method of claim 1, wherein a length of the base station identifier of the previous serving base station length is 48 bits.

5. A method of performing a handover in a subscriber station of a communication system, the method comprising:
   transmitting a ranging request message including a base station identifier of a previous serving base station to a target base station when the subscriber station detects a drop situation;
   receiving a ranging response message from the target base station that has acquired information of the subscriber station through the base station identifier of the previous serving base station; and
   performing network re-entry through the target base station.

6. The method of claim 5, wherein the ranging request message further includes a media access control (MAC) address of the subscriber station.

7. The method of claim 5, wherein a length of the base station identifier of the previous serving base station is 48 bits.

8. A method of generating a message for a handover in a subscriber station, the method comprising:
- generating a ranging request message at the subscriber station for transmission to a target base station when the subscriber station detects a drop situation;
- inserting a base station identifier of a previous serving base station into the ranging request by the subscriber station; and
- transmitting the ranging request message from the subscriber station to the target base station.

9. The method of claim 8, further comprising inserting a media access control (MAC) address of the subscriber station into the ranging request message.

10. The method of claim 8, wherein the inserting further comprises setting a length of the base station identifier of the previous serving base station to 48 bits.

11. A method of performing a handover on a subscriber station in a target base station, the method comprising:
- receiving a ranging request message including a base station identifier of a previous serving base station from the subscriber station when a drop situation is detected by the subscriber station;
- transmitting a response message on the ranging request message to the subscriber station; and
- performing network re-entry on the subscriber station.

12. The method of claim 11, wherein the ranging request message further includes a media access control (MAC) address of the subscriber station.

13. The method of claim 11, wherein a length of the base station identifier of the previous serving base station is 48 bits.

14. A method of performing a handover in a subscriber station, the method comprising:
- transmitting a ranging request message including a base station identifier of a previous serving base station to a target base station when the subscriber station detects a drop situation;
- receiving a response message on the ranging request message from the target base station; and
- performing network re-entry through the target base station.

15. The method of claim 14, wherein the ranging request message further includes a media access control (MAC) address of the subscriber station.

16. The method of claim 14, wherein a length of the base station identifier of the previous serving base station is 48 bits.

* * * * *